United States Patent [19]

Aughton

[11] Patent Number: 4,645,302

[45] Date of Patent: Feb. 24, 1987

[54] LIGHT BEAM-SPLITTER

[75] Inventor: John E. Aughton, London, England

[73] Assignee: Crosfield Electronics Limited, London, England

[21] Appl. No.: 561,117

[22] Filed: Dec. 13, 1983

[30] Foreign Application Priority Data

Dec. 21, 1982 [GB] United Kingdom ............... 8236345

[51] Int. Cl.$^4$ .................... G02B 27/10; G02B 5/04
[52] U.S. Cl. .................... 350/173; 350/171; 350/401
[58] Field of Search ........... 350/170, 171, 172, 173, 350/394, 400, 401, 402, 286, 287, 602

[56] References Cited

U.S. PATENT DOCUMENTS

| | | | |
|---|---|---|---|
| 3,402,364 | 9/1968 | De Lang | 372/100 |
| 3,982,819 | 9/1976 | Letellier | 350/457 |
| 4,084,883 | 4/1978 | Eastman et al. | 350/152 |
| 4,392,722 | 7/1983 | Shirasaki | 350/375 |

FOREIGN PATENT DOCUMENTS

| | | | |
|---|---|---|---|
| 0109915 | 7/1982 | Japan | 350/96.15 |
| 1549077 | 6/1979 | United Kingdom | 350/173 |

*Primary Examiner*—Jon W. Henry
*Attorney, Agent, or Firm*—Sughrue, Mion, Zinn, Macpeak and Seas

[57] ABSTRACT

To produce a plurality of parallel light beams from a single input beam, the input beam is incident on a partially transmissive face of a triangular prism, the other two faces of which are silvered. The input beam strikes the partially-transmissive face at such a position and at such an angle of incidence that it gives rise to only two parallel emitted beams, part of the emitted light arising from internal reflections at both silvered faces. A number of such prisms may be arranged in series so that the $n^{th}$ prism receives $2^{n-1}$ beams and emits only $2^n$ parallel output beams.

The partially-transmissive face or faces may be coated to give rise to output beams of substantially equal intensity. In one form, each beam entering each prism has equal S- and P-polarization components.

8 Claims, 2 Drawing Figures

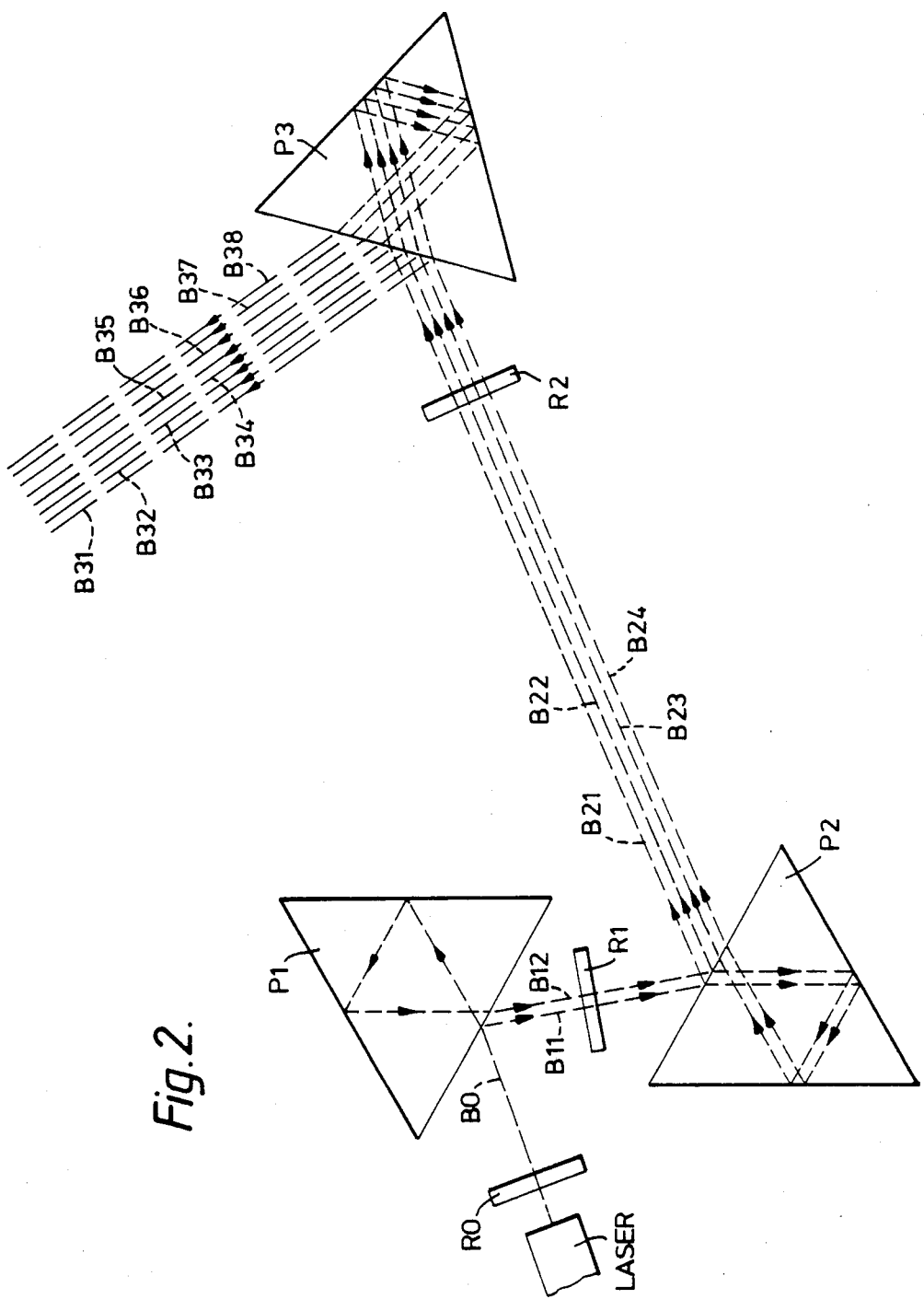

LIGHT BEAM-SPLITTER

BACKGROUND OF THE INVENTION

This invention concerns beam splitters and in particular those which produce a plurality of parallel beams from a single input beam. These beams are sometimes used to image on a surface an array of dots whose individual intensities can be controlled, for example in laser half-tone printing.

In laser printing applications, the output beams are generally required to be parallel, of equal intensity and equally spaced from each other. One apparatus for producing any desired number of beams from a single input beam comprises a number of half-silvered mirrors, that number being one less than the number of output beams required. Each half-silvered mirror receives only one input beam and splits that beam into mutually perpendicular transmitted and reflected beams of equal intensity. The half-silvered mirrors are arranged in parallel and in series so that each of the final output beams has undergone the same number of reflections and/or transmissions. Further mirrors are also required to bring the output beams into a parallel, equally-spaced relationship. This apparatus is unsatisfactory due to the large number of mirrors required and the difficulty of arranging their relative positions.

An improved beam splitter is described in our British patent No. 1522555. This beam splitter consists of just one block with parallel faces for receiving one input beam and for producing several output beams. Its parallel faces are coated in a manner which varies along the length of the block so as to vary the reflection/transmission coefficients along its length ensuring that at successive internal reflections the transmitted beams emerge parallel and of equal intensity. This beam splitter, however, suffers from the major disadvantage of cost of manufacture consequent on the need for the opposite faces to be accurately parallel and to receive many coating operations. The effect of the out-of-parallelism is progressive on successive transmitted beams. The opposite faces require a number of different coatings equal to the number of emitted beams, each coating applied under a vacuum, and, once constructed, the device cannot vary the spacing of the output beams, and the beams can never be contiguous. Moreover it is not feasible to multiply the number of beams produced, simply by combining like beam splitters in cascade. This is because successive beam splitters would require more closely spaced coatings, so that it would be simpler to derive all the beams from the first splitter by making it longer.

SUMMARY OF THE INVENTION

It is therefore an object of the invention to provide a beam splitter of simple construction which is capable of being used in cascade with similar beam splitters and the design of which allows considerable manufacturing tolerances. One such beam splitter, which incorporates a series of parallel slabs and uses the properties of polarised light, is described and claimed in our copending U.S. patent application Ser. No. 561,116 (claiming priority from British patent application No. 8236294).

According to the present invention a triangular prism for use in such a beam splitter has two silvered faces and one uniformly coated partially transmissive face, each face being parallel to the prism axis and each angle being less than 90°.

Apparatus for producing parallel light beams and including such a triangular prism further comprises: a light source producing a collimated monochromatic light beam; and means for positioning the source and prism so that the beam lies in a plane normal to the prism axis and strikes the partially-transmissive face at such a position and at such an angle of incidence that it gives rise to only two parallel output beams, a part of the total output light arising from internal reflections at both silvered faces of the prism. The prism axis is herein defined as the common line of intersection between the three imaginary internal planes extending from each edge angle of the prism and bisecting the opposite side.

In the above definition of the triangular prism, the term "silvered" is used in the broad sense of applying to a surface of an optical element a backing of any material which renders the element fully reflective at that surface.

A number of parallel light beams equal to $2^m$ is produced by apparatus in accordance with the invention comprising: a light source producing a collimated monochromatic light beam; M triangular prisms arranged in series with their axes parallel, each of the type described above, and arranged so that the $n^{th}$ prism receives $2^{n-1}$ beams and emits only $2^n$ parallel output beams.

It is a preferable feature of the apparatus that the partially-transmissive face of the prism, or of each prism, is coated so as to give rise to output beams of substantially equal intensity; moreover the angles of the faces of the prisms are preferably selected, and the positioning means so arranged, that the output beams from each prism after the first are equally spaced.

In a preferred example, the partially-transmissive face of the or each prism has a transmissivity: reflectivity ratio of substantially 2:1.

The apparatus works with any monochromatic light source, but in the preferred example an argon-ion laser is used.

BRIEF DESCRIPTION OF THE DRAWINGS

In order that the invention may be better understood, a preferred embodiment of the invention will now be described with reference to the accompanying drawings, wherein;

FIG. 2 shows beam splitting apparatus incorporating three such prisms in cascade.

DETAILED DESCRIPTION OF THE PREFERRED EMBODIMENTS

Figure 1:
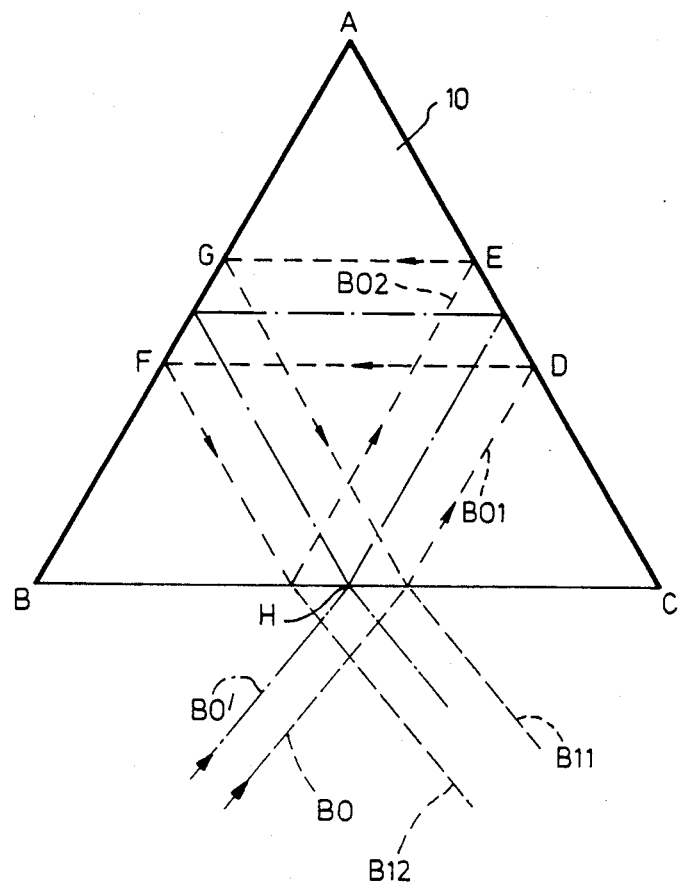
FIG. 1 shows a single triangular prism in accordance with the preferred embodiment.

A prism 10, FIG. 1, is transparent and of uniform triangular cross section, it is not necessarily equilateral. The derivation of the shape of the prism is described below.

An incident beam B0 from a laser divides at a partially-transmissive, coated face BC, into a reflected beam B11 and a refracted transmitted beam B01 which then undergoes first and second full internal reflections at D and F in the silvered faces AC and AB to be incident again on the partially-transmissive face BC. Here part of the beam B01 emerges as a refracted beam B12 and part of it (beam B02) undergoes a third reflection at face BC and fourth and fifth reflections at E and G on the silvered faces AC and AB. After reflection at G, a part of this beam emerges from the prism coincident with the first component B11 (which was initially reflected at face BC) and again a part of the beam undergoes a sixth internal reflection at face BC and seventh and eighth internal reflections at D and F and emerges, in part, to reinforce the first component B12. That part of the resultant beam which does not emerge reinforces B02; and so on. Thus the emergent beams include light which has not entered the prism and light which has been reflected 2, 8, 14, . . . times (beam B12) or 5, 11, 17, . . . times (beam B11).

Assuming that there is no interference of the beams, and that their intensities rather than their amplitudes are added, the final output beams B12 and B11 can be made of equal intensity by arranging that the coated face BC, for the selected angle of incidence, gives rise to a transmissivity: reflectivity ratio 2:1. Then if the intensity of the input beam BO is unity, the intensity of the first beam B11 is the sum of the series 0.33, 0.15, 0.015, etc., and the intensity of the second beam B12 is the sum of the series 0.44, 0.05, 0.005, etc.

The geometry of the triangle of cross section ABC is derived as follows. The output beams B12 B11 are to be parallel, therefore since each beam refracts at the same angle it must follow that the heavy lines shown within the triangle in FIG. 1, denoting the beam paths before and after reflections, consist of three sets of parallel lines, the spacing of each set being identical to the spacing of the output beams after refraction is taken into account. It follows from this geometry that the line DE joining the points of intersection of two of the pairs of parallel lines has a normal at D which bisects the angle between the lines; the same applies to the normal at E, and this argument can be extended to the lines AB and BC. It follows therefore that the line AC, an extension of ED, is at the correct angle for the pairs of parallel lines to represent internal reflections, since the angle of incidence is equal to the angle of reflection.

In this way, the triangle ABC is constructed from any three pairs of parallel, equally-spaced lines. Thus a triangular prism is designed to suit the required angle of incidence and output beam spacing. The required coating on the partially-transmissive face BC is then calculated so as to give equal intensities to the output beams B12, B11.

It is found that although the edges of the triangular prism have to be quite accurately parallel, there is considerable tolerance in the angles of the triangle ABC, so long as they remain uniform along the prism axis i.e. along the normal to the triangle ABC. A tolerance of 1° in an angle of 60° is realistic.

The apparatus is set up as follows, using means for adjusting both the angle of incidence of the laser beam and the position along the face BC at which it strikes the prism. A point H along the face BC is found for which an input beam position BO' (shown in dotted lines in FIG. 1) gives rise to only one output beam, also at H. The angle of incidence is then maintained while the beam is moved transversely to the position shown for the beam BO. This has the effect of splitting the output beam into two parallel output beams equally spaced from the original single output beam. The separation of the output beams can therefore simply be adjusted by the degree of this transverse motion.

In the description of the coating on the face BC above, it was assumed that the light did not interfere. If however the light is sufficiently coherent for the beams to recombine interferingly, then difficulties arising from the dependence of the relative intensities on the size of the prism, for example, can be overcome by the use of polarisation. A suitable piece of anisotropic material, for example a retarder or a rotator, may be inserted in the beam path BO between the laser and the prism to ensure that the incident beam has equal S-polarisation and P-polarisation components. The coated face BC is arranged to transmit P-polarisation components totally and to reflect S-polarisation components totally, so that the light destined for the output beams is oppositely polarised and consequently independent. The light paths would then differ from those shown in FIG. 1; the transmitted beam B01, being completely P-polarised, is reflected twice internally and is then completely transmitted through face BC to emerge as a beam B12 of equal intensity to the S-polarised component B11.

Larger numbers of output beams may be produced simply by arranging two or more such prisms in cascade or series, whether or not polarization is used, and an example of three prisms in cascade using polarisation is shown in FIG. 2. A beam BO from a laser 30 entering prism P1 gives rise to two output beams B11, B12 of equal intensity. Each of these beams strikes the partially-transmissive face of a second prism P2 and each gives rise to two further beams, making a total of four output beams B21, B22, B23 and B24 from the second prism, having equal intensities and equal separations. Finally, each of these four output beams is incident on the partially-transmissive face of a third prism P3, resulting in a set of eight parallel output beams B31 to B38. Clearly the number of beams produced is doubled with each successive prism, but no output beam has undergone a number of internal reflections greater than twice the number of prisms, if polarised light is used as described above. Beam B37 has undergone six internal reflections; beam B34 has undergone none.

As explained above, it is preferable to use the phenomenon of polarisation and to design each coated face totally to reflect one type of polarisation and to transmit the other type. It is then essential, as shown in FIG. 2, to interpose in the light paths between adjacent prisms a 45° rotator or a quarter-wavelength retarder R1, R2, or the like, to ensure equal S- and P- polarisation components in each input beam so that it gives rise to two beams of equal intensity.

An argon-ion laser is suitable for the purposes of half-tone printing; the beam from such a laser is polarised and requires a retarder or rotator, R0, for example, between the laser and the first prism. However, other light sources could be used in place of the argon-ion laser and this first retarder or rotator can be dispensed with if the input beam B0 would not anyway be polarised.

Although in the drawings the prisms are shown with angles of 60°, other angles may be used (provided that each is less than 90°).

I claim:

1. Apparatus for producing parallel light beams comprising: a light source producing a collimated monochromatic light beam; and a triangular prism having two silvered faces and one partially transmissive face, each face being parallel to the prism axis and each angle of the triangular prism being less than 90°, wherein the source and prism are positioned so that the beam lies in a plane normal to the prism axis and strikes the partially-transmissive face at such a position and at such an angle of incidence that it gives rise to only two parallel output beams, part of the total output light arising from internal reflections at both silvered faces of the prism, and wherein the partially transmissive face is coated so as to give rise to output beams of substantially equal intensity.

2. Apparatus for producing $2^m$ parallel light beams comprising: a light source producing a collimated monochromatic light beam; m triangular prisms arranged in series with their axes parallel, each having two silvered faces and one partially transmissive face, each face being parallel to the prism axis and each angle of the triangular prism being less than 90°, and arranged so that when a single light beam from the source enters a first prism of the series the $n^{th}$ prism receives $2^{n-1}$ beams and emits only $2^n$ parallel output beams.

3. Apparatus in accordance with claim 2, wherein the partially transmissive face of each prism has a transmissivity:reflectivity ratio of substantially 2:1.

4. Apparatus in accordance with claim 2, comprising a quarter-wavelength retarder positioned in a beam path between adjacent prisms in the series so as to intercept beams passing from one of said adjacent prisms to another.

5. Apparatus in accordance with claim 2, comprising a 45° rotator positioned in a beam path between adjacent prisms in the series so as to intercept beams passing from one of said adjacent prisms to another.

6. Apparatus in accordance with claim 2, comprising a plurality of quarter-wavelength retarders individually positioned in beam paths between the light source and a first prism and between adjacent prisms in the series, so as to intercept beams passing from one of said adjacent prisms to another.

7. Apparatus in accordance with claim 2, comprising a plurality of 45° rotators individually positioned in beam paths between the light source and a first prism and between adjacent prisms in the series so as to intercept beams passing from one of said adjacent prisms to another.

8. Apparatus for producing parallel light beams comprising: a light source producing a collimated monochromatic light bean; and a triangular prism having two silvered faces and one partially transmissive face, each face being parallel to the prism axis and each angle of the triangular prism being less than 90°, wherein the source and prism are positioned so that the beam lies in a normal plane to the prism axis and strikes the partially-transmissive face at such a position and at such an angle of incidence that it gives rise to only two parallel output beams, part of the total output light arising from internal reflections at both silvered faces of the prism, and wherein the partially transmissive face of the prism has a transmissivity:reflectivity ratio of substantially 2:1.

* * * * *